United States Patent
Vinches et al.

(10) Patent No.: US 12,434,848 B2
(45) Date of Patent: Oct. 7, 2025

(54) ELECTRICAL PACK JOINT

(71) Applicant: AIRBUS OPERATIONS (S.A.S.), Toulouse (FR)

(72) Inventors: Frédéric Vinches, Toulouse (FR); Rémi Amargier, Toulouse (FR)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 103 days.

(21) Appl. No.: 18/458,681

(22) Filed: Aug. 30, 2023

(65) Prior Publication Data
US 2025/0074609 A1    Mar. 6, 2025

(51) Int. Cl.
*B64D 27/40*  (2024.01)
*B64C 3/18*  (2006.01)

(52) U.S. Cl.
CPC .............. *B64D 27/40* (2024.01); *B64C 3/18* (2013.01); *B64C 3/185* (2013.01); *B64C 3/187* (2013.01)

(58) Field of Classification Search
CPC ......... B64D 27/40; B64C 3/185; B64C 3/187; H01M 50/249; H01M 50/244
See application file for complete search history.

(56) References Cited

U.S. PATENT DOCUMENTS

| | | | |
|---|---|---|---|
| 5,560,572 A * | 10/1996 | Osborn | G12B 9/00 248/27.3 |
| 2021/0391627 A1* | 12/2021 | Villanueva | B64C 1/16 |
| 2022/0216551 A1* | 7/2022 | Hansel | H01M 10/4285 |
| 2024/0021943 A1* | 1/2024 | Amante | B60L 50/66 |

* cited by examiner

*Primary Examiner* — Kimberly S Berona
*Assistant Examiner* — Steven J Shur
(74) *Attorney, Agent, or Firm* — Nixon & Vanderhye P.C.

(57) ABSTRACT

A joint for aircraft electrical pack or battery pack for attaching the electrical pack to an aircraft component is disclosed. The electrical pack includes a surface having a dovetail dowel integrally formed thereon, and a dovetail rail is attached to the aircraft component. The electrical pack is mounted and assembled to the aircraft component by securing the dovetail dowel to the dovetail rail forming a dovetail joint. The aircraft component may be an engine pylon.

15 Claims, 11 Drawing Sheets

ELECTRICAL PACK JOINT

TECHNICAL FIELD

The disclosure is generally related to an electrical pack joint and, more specifically, a dovetail joint and a method of mounting and attaching an electrical pack to an aircraft component.

BACKGROUND

Recent developments in electric or hybrid propulsion systems for aircraft to reduce carbon emissions generated by internal combustion engines and jet engines have resulted in the need for electric propulsion systems for an aircraft.

Electrically operated propulsion systems require battery packs or electrical packs as their power source.

Electrical packs provide additional weight to the total weight of the aircraft. Considering the safety requirements and stringent certification process for commercial aircraft, the electrical packs are required to be installed and secured properly at specific locations on the aircraft. Currently, the electrical packs may be secured using various clamps and brackets to securely hold the electrical packs in place.

Using the conventional clamps and brackets will require additional components which add to the overall weight, and the clamps and brackets also require different safety and certification requirements.

The position in which to install the battery packs for an electric propulsion system for an electric aircraft will require access from various points. The prior art installation using the brackets and clamps may result in cumbersome access to the electrical packs in order to install, remove, and repair them.

Placing the electrical packs at any location on the aircraft and securing them to another aircraft component will also affect the certification, and considering the weight of the electrical packs, the electrical packs may not be secured to just any aircraft part.

Therefore, there is a need for installing an electrical pack on an aircraft at a location which will provide easy and less burdensome access to install and remove the electrical pack, and on an aircraft structural part or component which will provide structural rigidity and strength to support the electrical packs, such as mounting the electrical pack on a torsion box or engine pylon which can support large weights and absorb large forces and torque from the engine.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The disclosure is embodied as a joint for securing an electrical pack to an aircraft component, the joint including a dovetail dowel integrally formed with a surface of the electrical pack. A dovetail rail is attached to the aircraft component, in which the dovetail dowel is removably secured within the dovetail rail securing the electrical pack to the aircraft component.

The disclosure is also embodied as an aircraft comprising at least one electrical propulsion unit, at least one pylon for securing the at least one electric propulsion unit to a wing, at least one electrical pack comprising a housing having an external surface, a dovetail joint comprising a dovetail rail and a dovetail dowel. The dovetail rail is attached to the at least one engine pylon, and the dovetail dowel is attached or integrally formed with the electrical pack external surface.

The disclosure is also embodied as a method of securing a first electrical pack to an aircraft component, comprising providing a first dovetail dowel on a surface of the electrical pack, providing a first dovetail rail on a surface of the aircraft component, sliding the first dovetail dowel within the first dovetail rail, providing a flange, and attaching the flange to the first dovetail rail to secure the dovetail dowel within the first dovetail rail.

BRIEF DESCRIPTION OF THE DRAWINGS

For an understanding of embodiments of the disclosure, reference is now made to the following description taken in conjunction with the accompanying drawings.

DETAILED DESCRIPTION

Some embodiments will now be described with reference to the Figures, like numerals being used to refer to like and corresponding parts of the various drawings.

Figure 1:
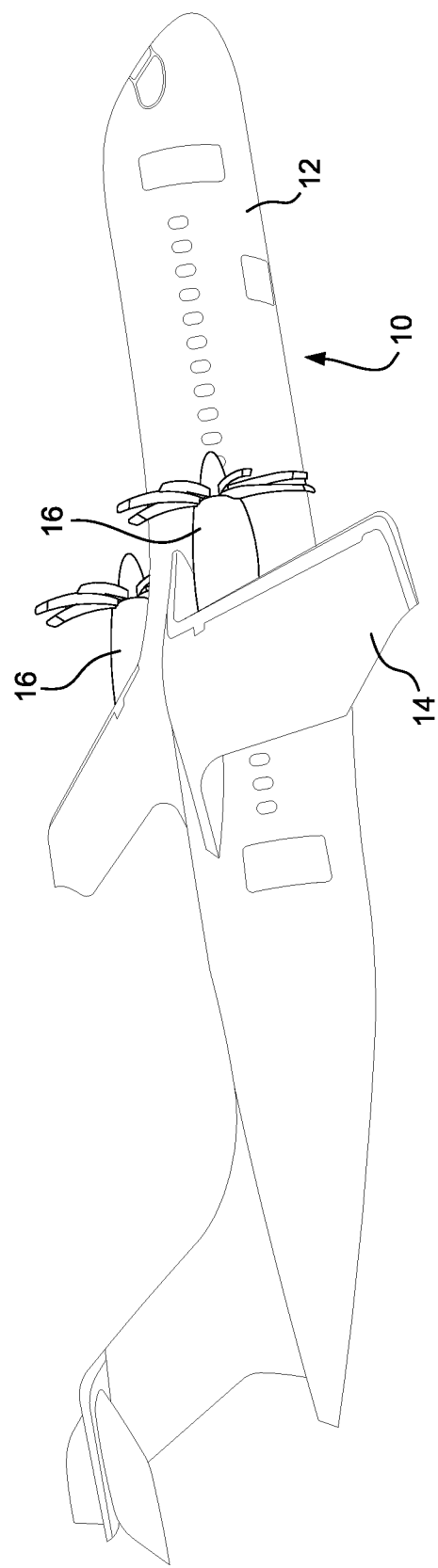
FIG. 1 is a perspective view of an aircraft embodying electrical packs mounted and installed in accordance with an exemplary embodiment.

Referring now to FIG. 1, an aircraft 10 is shown having a fuselage 12, a main fixed wing 14, and an electric or hybrid propulsion unit 16 mounted on the main fixed wing 14. The aircraft 10 may include multiple electric or hybrid propulsion units 16 attached to the main fixed wing 14, but in this exemplary embodiment, the aircraft 10 includes a pair of electric propulsion units 16.

Figure 2:
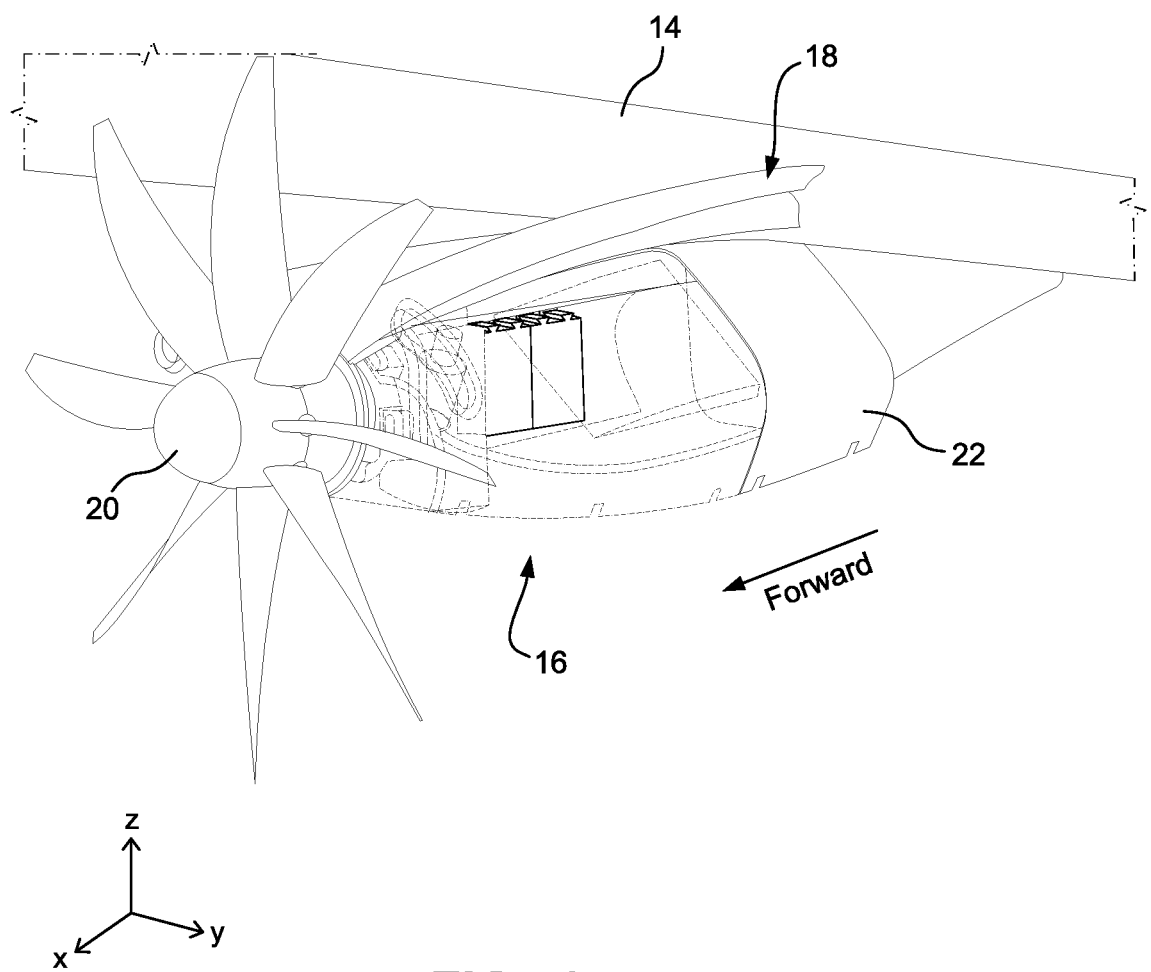
FIG. 2 is a perspective view of an aircraft electric propulsion unit mounted on an aircraft wing, and including electrical packs mounted in accordance with an exemplary embodiment.

Referring to FIG. 2, the electric propulsion unit 16 is generally shown attached to the main fixed wing 14 by a pylon or torsion box 18. The electric propulsion unit 16 includes a propeller 20 in which propels the aircraft in the forward direction of travel as shown by an arrow. It is noted that the electric propulsion unit 16 defines, in a longitudinal direction X, the heading travel direction of the aircraft 10 in a fore-aft direction, and the vertical direction Z is defined orthogonal to the X direction.

The electric propulsion unit 18 may include a cowling 22. The cowling 22 may have hingedly connected covers or components providing access to an interior portion of the electric propulsion unit 16.

Figure 3:
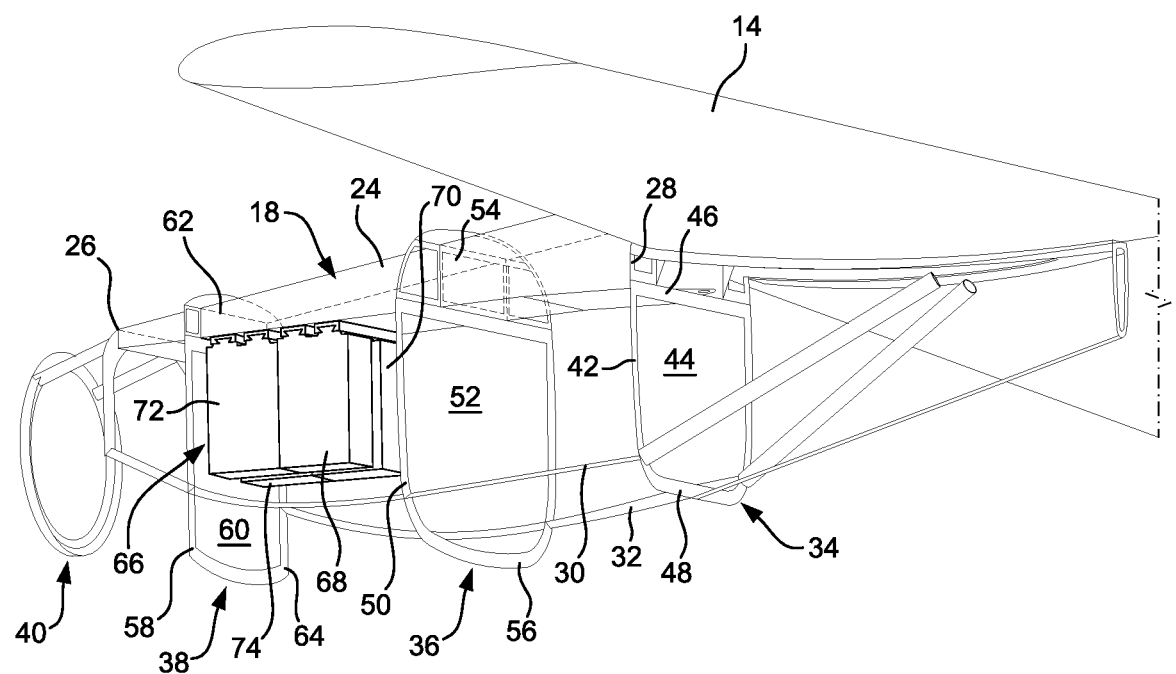
FIG. 3 is a rear detailed and exploded view of an engine pylon or torsion box illustrating the electrical packs mounted on the pylon or torsion box in accordance with an exemplary embodiment.

Referring to FIG. 3, the pylon or torsion box 18 may include an upper spar 24 extending in the forward direction X having a first end 26 and an opposing second 28. The second end 28 of the upper spar 24 may be attached to the main fixed wing 14. The pylon 18 may include a first lower spar 30 and a second lower spar 32 spaced apart from the first lower spar 30. A plurality of ribs, namely, a rear rib 34, an intermediate rib 36, a front rib 38, and a nose rib 40 are attached in a longitudinal direction to the upper spar 24 and the first lower spar 30 and the second lower spar 32.

Moreover, the pylon 18 transmits loads between the upper spar 24 and the main fixed wing 14, the rear rib 34, intermediate rib 36, and front rib 38, as well as reacting to the forces, torque, and thrust generated by electric propulsion unit 16.

The rear rib 34 may include a peripheral portion 42 comprising an opening 44, an upper part 46 attached to the second end 28 of the upper spar 24, and a lower part 48 bounded between the first lower spar 30 and second lower spar 32.

Similarly, the intermediate rib 36 may include a peripheral portion 50 comprising an opening 52, an upper part 54 attached to the upper spar 24, and a lower part 56, in which the peripheral portion 50 is attached to and bounds a portion of the first lower spar 30 and second lower spar 32.

The front rib 38 may include a peripheral portion 58 comprising an opening 60, an upper part 62 attached to the upper spar 24, and a lower part 64, in which the peripheral portion 58 is attached to and bounds a portion of the first lower spar 30 and the second lower spar 32.

A plurality of electrical packs 66 is illustrated in a mounted configuration. The plurality of electrical packs 66 may comprise varying different number of packs, for example, but not limited to, a first electrical pack 68, a second electrical pack 70, a third electrical pack 72, and a fourth electrical pack 74.

Each electrical pack may have a rectangular prism shape, however, other shapes and configuration, such as but not limited to, cylindrical, are contemplated to be within the scope of the present invention. As will be explained in greater detail, the plurality of electrical packs 66 may be mounted to and supported by the engine pylon 18, and may be disposed between the intermediate rib 36 and front rib 38.

To support the weight of the plurality of the electrical packs 66, the present disclosure contemplates supporting the plurality of the electrical packs 66 from the pylon or torsion box 18. The first, second, third, and further electrical packs 68, 70, 72, and 74 are juxtaposed next to one another, forming a larger rectangular prism shape, and they may be removably secured to one another so that one can be removed and replaced without removing the other electrical packs.

Figure 4:
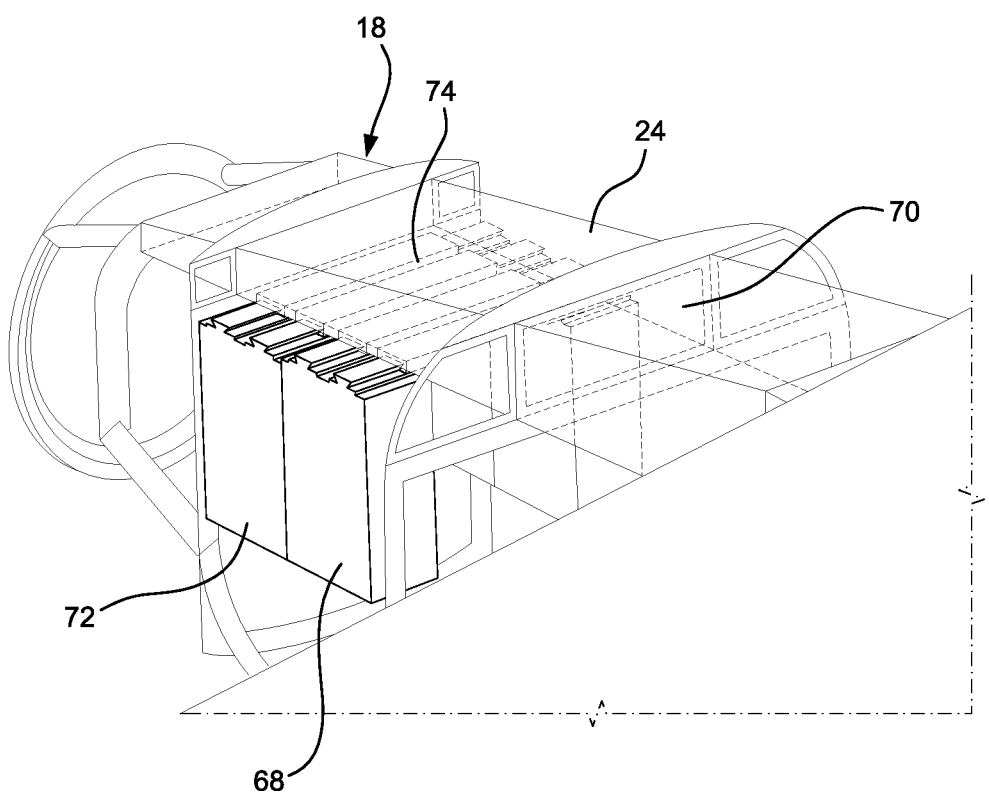
FIG. 4 is a detailed view of a plurality of electrical packs mounted and suspended from a spar of the engine pylon or torsion box in accordance with an exemplary embodiment.
Figure 5:
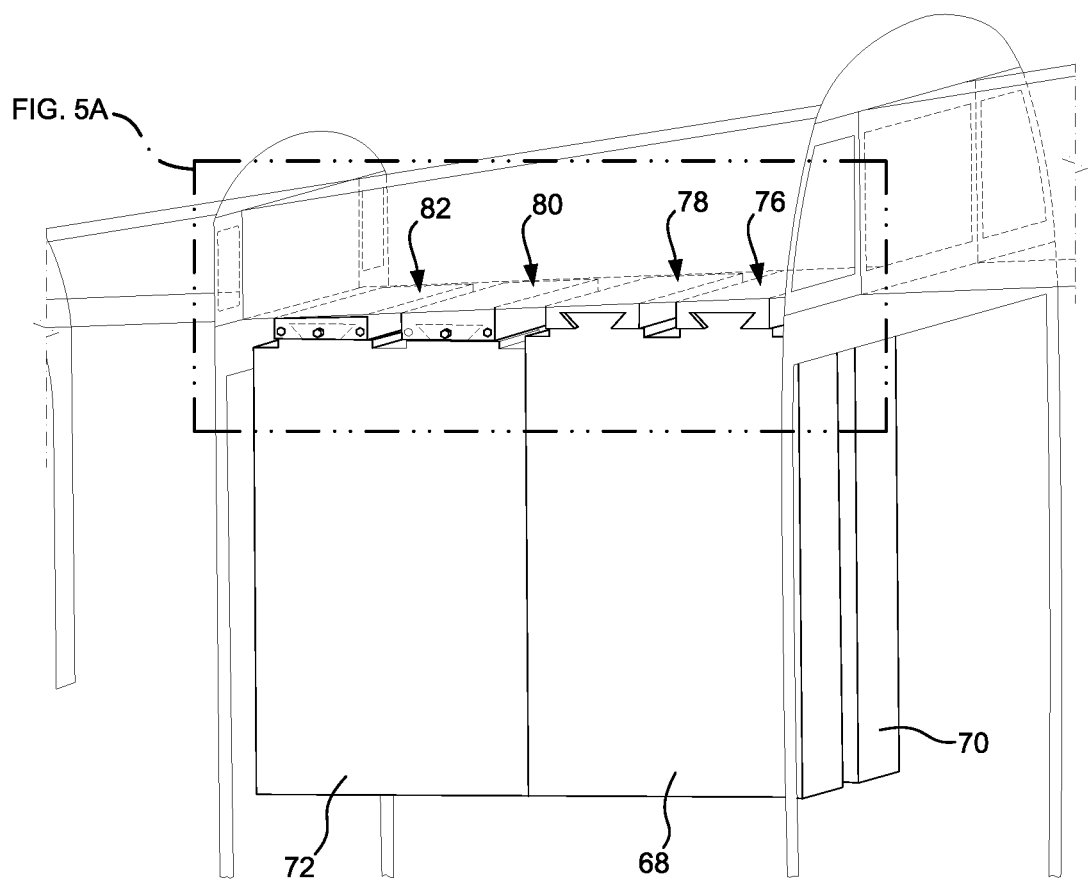
FIG. 5 is a side perspective view of the plurality of electrical packs mounted in accordance with an embodiment shown in FIG. 4.

Referring to FIGS. 4 and 5, a first embodiment of the mounting assembly of the plurality of the electrical packs 66 is illustrated. FIG. 4 illustrates each of the electrical packs in preparatory position to be installed and supported by the pylon or torsion box 18. As will be explained in greater detail here, the securing and mounting mechanism for the electrical packs entails using dovetail joints.

Conventionally, dovetail joints are used in areas where substantial strength is required to support the weight of a component without the use of any adhesive or fasteners. In combination with the mounting of the plurality of the electrical packs 66 to the torsion box or pylon 18, not only weight of the plurality of the electrical packs 66 is supported by such sturdy structure, but also the vibrations, torque, and forces generated by the electric propulsion unit 16 are transferred to the engine pylon 18 and will not affect the sturdy securement of the plurality of the electrical packs 66 to the engine pylon 18.

A dovetail joint comprises a rail component and a dowel component. Referring to FIG. 5, the current securing mechanism includes a first dovetail rail 76, a second dovetail rail 78, a third dovetail rail 80, and a fourth dovetail rail 82. The first dovetail rail 76 and the second dovetail rail 78 are configured to support the first electrical pack 68 and the second electrical pack 70. The third dovetail rail 80 and the fourth dovetail rail 82 are configured to support the third electrical pack 72 and the fourth electrical pack 74.

The first dovetail rail 76 may have a substantially rectangular shape and configuration extending substantially the width of the upper spar 24 in a direction that is transverse to the forward direction or the direction of flight.

Figure 5A:
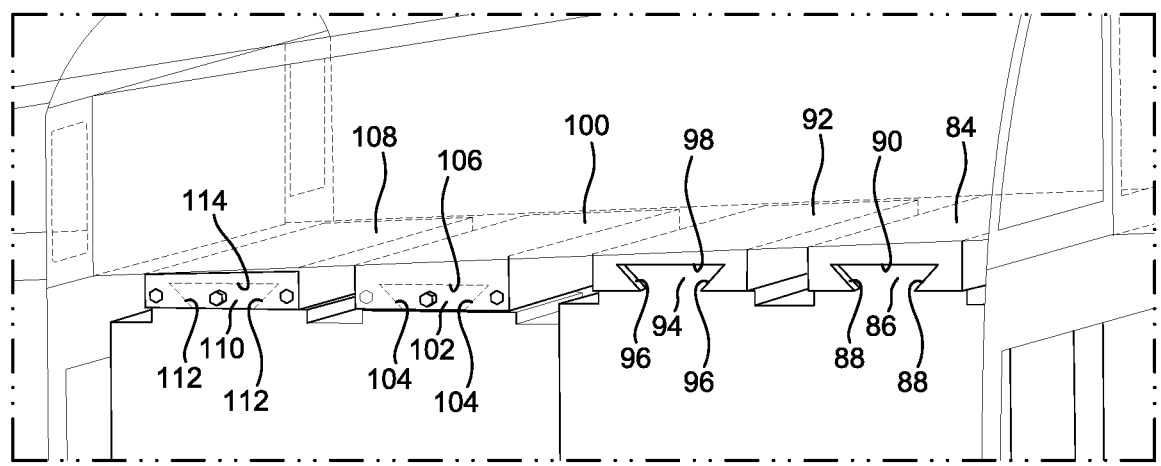
FIG. 5A is an enlarged view of a dovetail joint and assembly for securing the plurality of the electrical packs to the engine pylon or torsion box as shown in FIG. 5.

As best seen from the enlarged FIG. 5A, the first dovetail rail 76 may include an upper surface 84 which is attached to the surface of the upper spar 24 for securing the first dovetail rail 76 to the pylon by means such as, but not limited to, screws or welding.

The first dovetail rail 76 may include a lower channel 86 extending substantially the length of the first dovetail rail 76 and having a trapezoidal shape and configuration including a pair opposing inwardly slanted surfaces 88 and an upper face 90 bounding and forming the lower channel 86.

The second dovetail rail 78 similarly may have a substantially rectangular shape and configuration extending substantially the width of the upper spar 24 in a direction that is transverse to the forward direction or the direction of flight, and spaced apart from the first dovetail rail 76 in the forward direction. The second dovetail rail 78 may include an upper surface 92 which is attached to the surface of the upper spar 24 for securing the second dovetail rail 78 to the pylon by means such as, but not limited to, screws or welding.

The second dovetail rail 78 may include a lower channel 94 extending substantially the length of the second dovetail rail 78 and having a trapezoidal shape and configuration including a pair opposing inwardly slanted surfaces 96 and an upper face 98 bounding and forming the lower channel 94.

The third dovetail rail 80 similarly may have a substantially rectangular shape and configuration extending substantially the width of the upper spar 24 in a direction that is transverse to the forward direction or the direction of flight, and spaced apart from the second dovetail rail 78 in the forward direction, in which the second dovetail rail 78 is disposed between the first dovetail rail 76 and the third dovetail rail 80.

The third dovetail rail 80 may include an upper surface 100 which is attached to the surface of the upper spar 24 for securing the third dovetail rail 80 to the pylon by means such as, but not limited to, screws or welding.

The third dovetail rail 80 may include a lower channel 102 extending substantially the length of the third dovetail rail 80 having a trapezoidal shape and configuration including a pair opposing inwardly slanted surfaces 104 and an upper face 106 bounding and forming the lower channel 102.

The fourth dovetail rail 82 similarly may have a substantially rectangular shape and configuration extending substantially the width of the upper spar 24 in a direction that is transverse to the forward direction or the direction of flight, and spaced apart from the third dovetail rail 80 in the forward direction, in which the third dovetail rail 80 is disposed between the second dovetail rail 78 and the fourth dovetail rail 82.

The fourth dovetail rail 82 may include an upper surface 108 which is attached to the surface of the upper spar 24 for securing the fourth dovetail rail 82 to the pylon by means such as, but not limited to, screws or welding. The fourth dovetail rail 82 may include a lower channel 110 extending substantially the length of the fourth dovetail rail 82 and having a trapezoidal shape and configuration including a pair opposing inwardly slanted surfaces 112 and an upper face 114 bounding and forming the lower channel 110.

Figure 6:
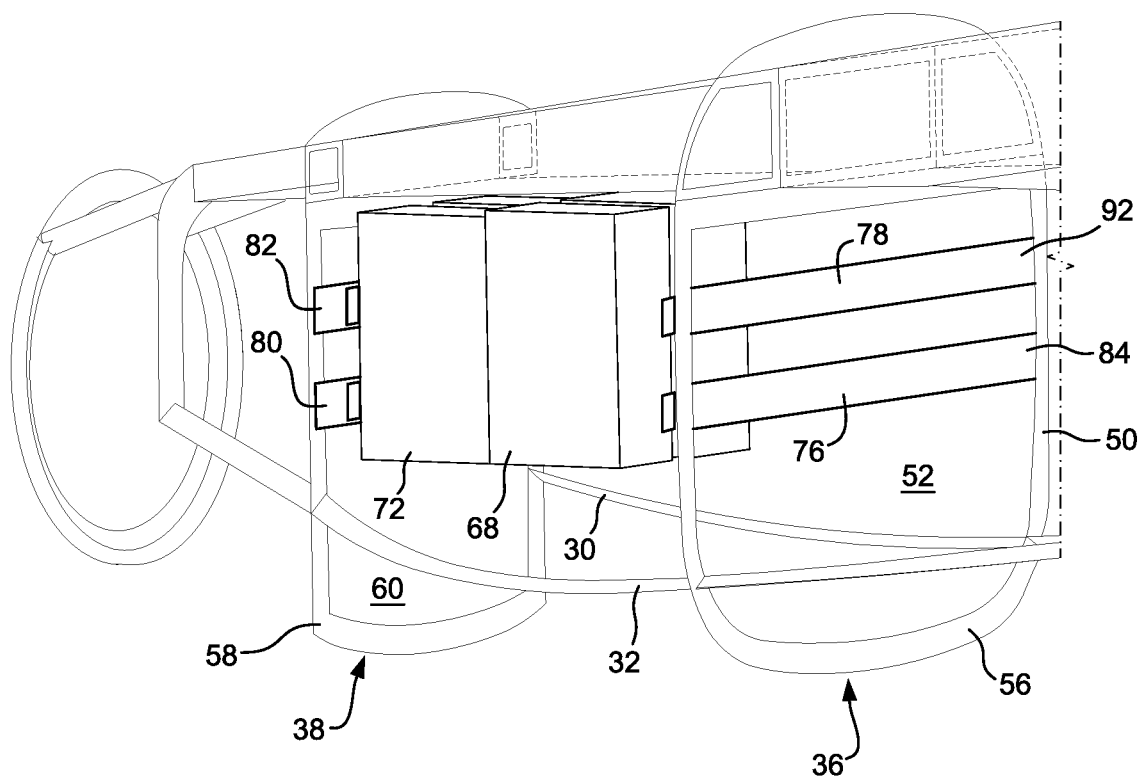
FIG. 6 is a rear perspective view of the plurality of electrical packs mounted on to frames or ribs in accordance with an exemplary embodiment.

Referring to FIG. 6, a second embodiment of the dovetail joint and securing mechanism of the plurality of the electrical packs 66 is illustrated. In this embodiment, the first dovetail rail 76 may be attached to the intermediate rib 36 instead of the upper spar 24. The first dovetail rail 76 extends across the opening 52 of the intermediate rib 36 and may be secured to the peripheral portion 50 at the upper surface 84 of the first dovetail rail 76 by means such as, but not limited to, welding or screws.

Similarly, the second dovetail rail 78 may be attached to the intermediate rib 36 instead of the upper spar 24. The second dovetail rail 76 may extend across the opening 52 of the intermediate rib 36 and is secured to the peripheral portion 50 at the upper surface 92 of the second dovetail rail 78 by means such as, but not limited to, welding or screws. The second dovetail rail 78 may be spaced apart above the first dovetail rail 76 in the Z direction, orthogonal to the forward direction of the aircraft travel.

It is noted that the third dovetail rail 80 and the fourth dovetail rail 82 mirror the same dovetail joint and attachment mechanism as the first dovetail rail 76 and the second dovetail rail 78, but may be attached to the front rib 38 at the peripheral portion 58 by welding, screws, or the securing means.

Figure 7:
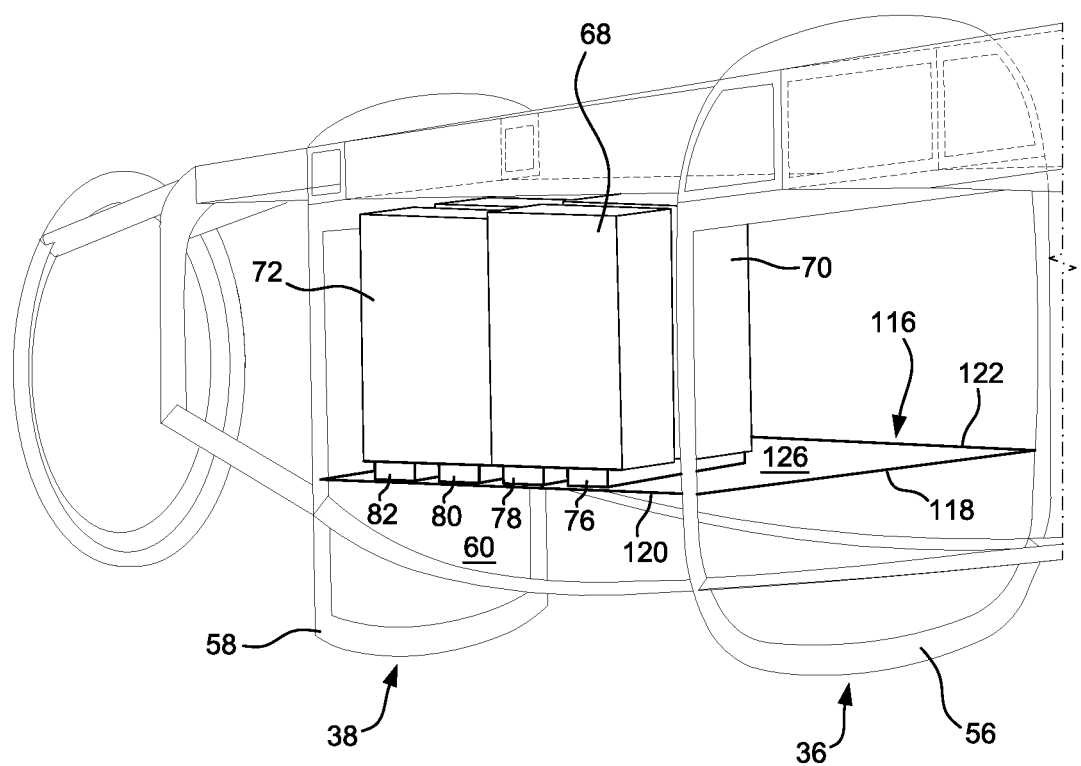
FIG. 7 is a rear perspective view of the plurality of electrical packs mounted to a support floor in accordance with an exemplary embodiment.

Referring to FIG. 7, an alternative embodiment of the dovetail joint and securing mechanism is illustrated. In this embodiment, the plurality of the electrical packs 66 may be supported on a floor member 116 rather than being secured to the upper spar 24 or the intermediate rib 36 and the front rib 38.

The floor member 116 may include a first side 118, a second side 120, a third side 122, and fourth side 124, bounding an upper planar surface 126. Although the floor member 116 is rectangular in shape or configuration, other shapes such as, but not limited to, circular or oval are contemplated to be within the scope of the present disclosure.

The first side 118 of floor member 116 may be attached to the intermediate rib 36 along a length thereof or at the two corners by, for example, bolts or welding, although other securing means are contemplated to be within the scope of the present disclosure.

Similarly, the second side 120 of floor member 116 may be attached to the front rib 38 along a length thereof or at the two corners by, for example, bolts or welding, although other securing means are contemplated to be within the scope of the present disclosure.

As best seen in FIG. 7, the plurality of electrical packs 66 may be supported on by, and secured to, the upper planar surface 126 of the floor member 116 in a similar manner as the other embodiments in which the first dovetail rail 76, the second dovetail rail 78, the third dovetail rail 80, and the fourth dovetail 82 are attached to the upper spar 24 of the pylon 18.

Figure 8:
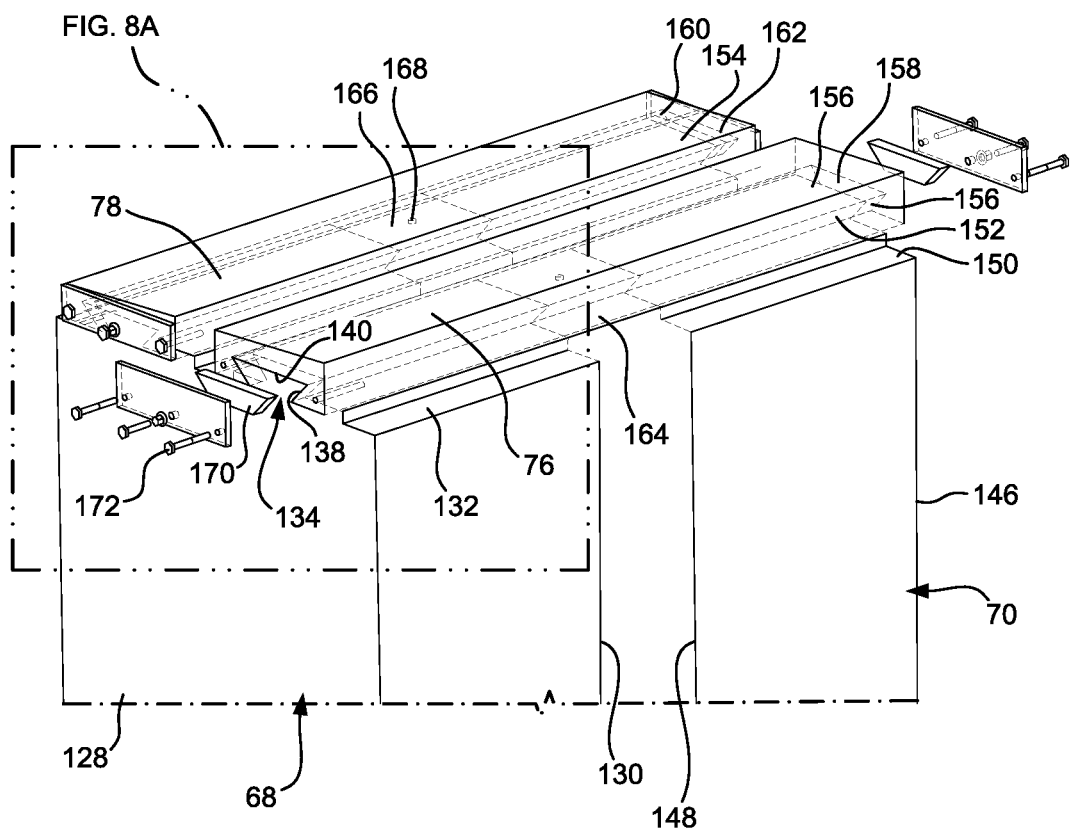
FIG. 8 is a perspective view of and detailed illustration of the mounting principle and dovetail joint attachment of the plurality of electrical packs in accordance with an exemplary embodiment.
Figure 8A:
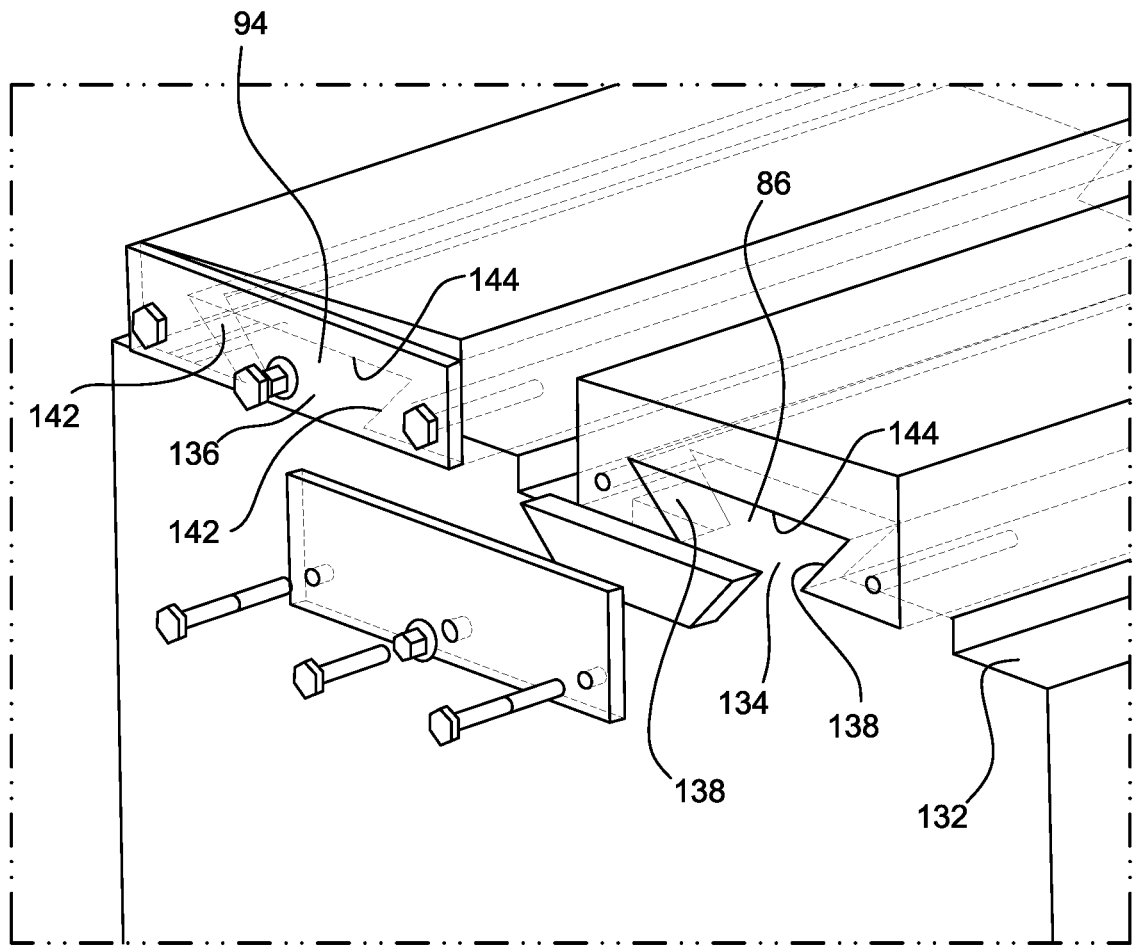
FIG. 8A is an enlarged view of a dovetail joint and assembly for securing the plurality of the electrical packs to the engine pylon or torsion box as shown in FIG. 8.

Referring to FIGS. 4, 8 and 8a, the dovetail joint and securing mechanism and assembly is illustrated with respect to securing the first electrical pack 68 and the second electrical pack 70 to the upper spar 24 of the pylon 18. It is noted that the same principle applies to the securing of the third electrical pack 72 and the fourth electrical pack 74 to the engine pylon or torsion box 18, as well as securing any of the electrical packs of the plurality of electrical packs 66 to the intermediate rib 36, the front rib 38, or the floor member 116.

The first electrical pack 68 may include a front side 128, a rear side 130, and a top side 132. A first longitudinal dovetail dowel 134 may be integrally formed and part of the top side 132 extending substantially the length the top side 132, and a second longitudinal dovetail dowel 136, running in parallel to the first longitudinal dovetail dowel 134, and integral formed and part of the top side 132.

The first and the second longitudinal dovetail dowels 134, 136 each have an inverted trapezoidal shape and configuration. The first longitudinal dovetail dowel 134 includes a pair of outwardly extending slanted surfaces 138 bounding an upper surface 140, and similarly. The second longitudinal dovetail dowel 136 includes pair of outwardly extending slanted surfaces 142 bounding an upper surface 144.

The second electrical pack 70 may include a front side 146, a rear side 148, and a top side 150. A first longitudinal dovetail dowel 152 may be integrally formed and part of the top side 150 extending substantially the length the top side 150, and a second longitudinal dovetail dowel 154, running in parallel to the first longitudinal dovetail dowel 152, and integrally formed and part of the top side 150.

The first and the second longitudinal dovetail dowels 152, 154 each have an inverted trapezoidal shape and configuration. The first longitudinal dovetail dowel 152 includes a pair of outwardly extending slanted surfaces 156 bounding an upper surface 158. Similarly, the second longitudinal dovetail dowel 154 includes pair of outwardly extending slanted surfaces 160 bounding an upper surface 162.

The first electrical pack 68 may be assembled by aligning the first dovetail dowel 134 of the first electrical pack 68 with the first lower channel 86 of the first dovetail rail 76, and the aligning the second dovetail dowel 136 of the first electrical pack 68 with the second lower channel 94 of the second dovetail rail 78.

The pair of opposing inwardly slanted surfaces 88 of the first dovetail rail 76 may be flush against the pair of opposing outwardly slanted surfaces 138 of the first dovetail dowel 134, and the pair of opposing inwardly slanted surface of 96 of the second dovetail rail 78 may be flush against the pair of opposing outwardly slanted surfaces 142 of the second dovetail dowel 136.

During the assembly and mounting of the electrical packs, their precision positioning is attained using a number of shims. Shims are commonly used to adjust the clearance or space between two parts so that the final product is manufactured within the specified tolerances. As seen from FIGS. 8 and 8A, a first shim 164 may be positioned within and slid through the lower channel 86 of the first dovetail rail 76, and a second shim 166 may be positioned within and slid through the lower channel 94 of the second dovetail rail 78.

Once the first electrical pack 68 and the second electrical pack 70 are accurately positioned within the specific location and based on the required precision, the first shim 164 may be secured to first dovetail rail 76 by a screw 168, and the second shim 166 may be secured to the second dovetail rail 78 by another screw 168.

It is noted that the assembly and alignment of the other dovetail dowels and dovetailed rails of the third electrical pack 72, and the fourth electrical pack 74 are performed in a similar manner as explained with respect to the first electrical pack 68 and the second electrical pack 70 above.

Furthermore, additional positioning and precision mounting may be achieved using a plurality of end shims 170 which can be sandwiched and secured at an end of the dovetail rails and secured with a plurality of screws 172 or other fastening means.

Figure 9:
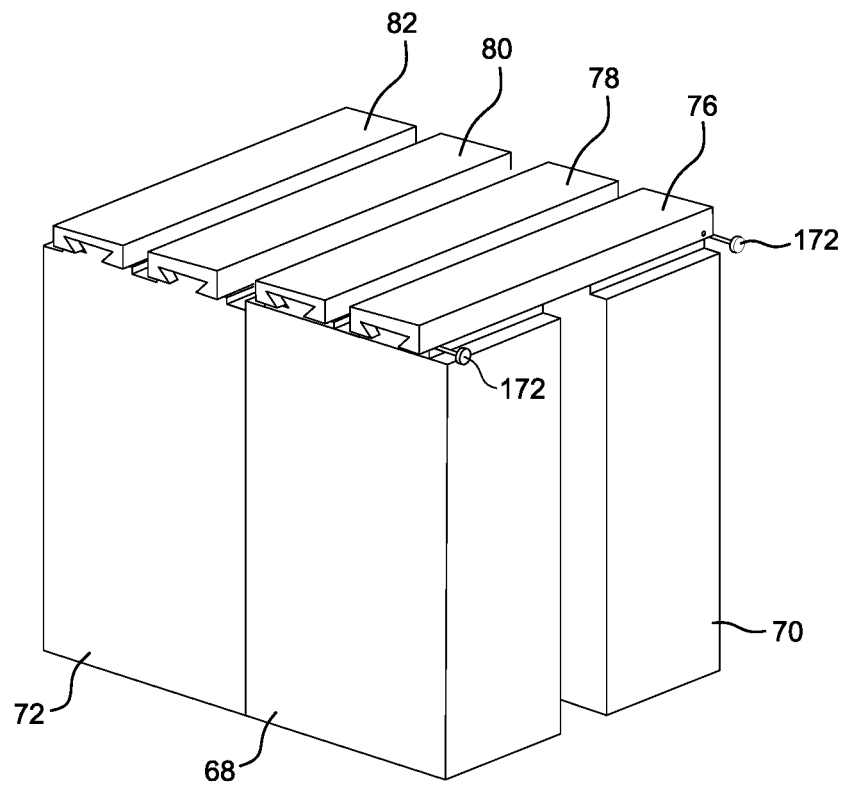
FIG. 9 is a perspective view of a mounting principle and dovetail joint and assembly of the plurality of electrical packs in accordance with an exemplary embodiment.

Referring to FIG. 9, an alternative mounting of the first electrical pack 68, the second electrical pack 70, the third electrical pack 72, and the fourth election pack 74 is illustrated. In this embodiment, a plurality of lateral screws or bolts 172 are used to secure the electrical packs in a final assembled form once they are mounted onto the first dovetail rail 76, the second dovetail rail 78, the third dovetail rail 80, and the fourth dovetail rail 82, respectively.

Figure 10:
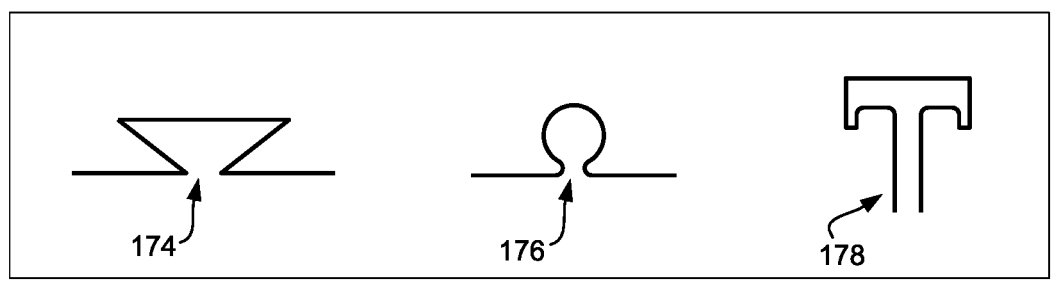
FIG. 10 illustrates various cross sectional shapes of the dovetail dowels for the dovetail assembly.

Referring to FIG. 10, various shapes and configurations, in cross section, of the dovetail dowels and dovetail rails are illustrated to be contemplated within the scope of the present disclosure. The cross-sections are, for example, but not limited to, trapezoidal-shaped 174, omega-shaped "Ω" 176, and T-shaped 178.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means "and/or" (either or both). Furthermore, characteristics or steps which have been described may also be used in combination with other characteristics or steps and in any order unless the disclosure or context suggests otherwise.

The invention claimed is:

1. A joint for securing an electrical pack to an aircraft component, comprising:
 a dovetail dowel integrally formed with a surface of the electrical pack,
 a dovetail rail attached to the aircraft component,
 wherein the dovetail dowel is removably secured within the dovetail rail securing the electrical pack to the aircraft component,
 a shim positioned within the dovetail rail and disposed between an outer surface of the dovetail dowel and an inner surface of the dovetail rail, and
 wherein the shim is secured to the aircraft component by a fastener to retain the electrical pack in a final assembled position.

2. The joint of claim 1, wherein the aircraft component is an engine pylon.

3. The joint of claim 2, wherein the engine pylon includes an upper spar, wherein the dovetail rail is attached to the upper spar.

4. The joint of claim 1, wherein the aircraft component is an engine pylon including a rib, and wherein the dovetail rail is attached to the rib.

5. The joint of claim 1, wherein the aircraft component is an engine pylon comprising a floor member, a front rib, a rear rib, and wherein the floor member is attached to the front rib and the rear rib.

6. The joint of claim 5, wherein the dovetail rail is attached to an upper surface of the floor member supporting the electrical pack.

7. The joint of claim 1, wherein the dovetail rail includes an elongated channel opening.

8. The joint of claim 1, wherein the dovetail dowel comprises a trapezoidal shape and configuration and a pair of externally slanted surfaces,
 wherein the dovetail rial comprises an elongated channel with a pair of inwardly slanted surfaces, and
 wherein the pair of externally slanted surfaces are substantially flush against the pair of inwardly slanted surface when the electrical pack is mounted on the engine pylon.

9. The joint of claim 1, wherein the dovetail dowel has an omega-shaped configuration.

10. The joint of claim 1, wherein the dovetail dowel has a T-shaped configuration.

11. An aircraft, comprising:
 at least one electrical propulsion unit,
 at least one pylon for securing the at least one electric propulsion unit to a wing,
 at least one electrical pack comprising a housing having an external surface,
 a dovetail joint comprising a dovetail rail and a dovetail dowel,
 wherein the dovetail rail is attached to the at least one engine pylon,
 wherein the dovetail dowel is attached or integrally formed with the electrical pack external surface,
 a shim positioned within the dovetail rail and disposed between an outer surface of the dovetail dowel and an inner surface of the dovetail rail, and
 wherein the shim is secured to the aircraft component by a fastener to retain the at least one electrical pack in a final assembled position.

12. The aircraft of claim 11, wherein the at least one electrical pack comprises two electrical packs, and wherein the dovetail joint further comprises a shim disposed between the two electrical packs in a mounted configuration.

13. A method of securing an electrical pack to an aircraft component, comprising:
 providing a first dovetail dowel on a surface of the electrical pack,
 providing a first dovetail rail on a surface of the aircraft component,
 sliding the first dovetail dowel within the first dovetail rail,
 providing a flange, attaching the flange to the first dovetail rail to secure the dovetail dowel within the first dovetail rail, providing a shim, positioning the shim within the first dovetail rail and disposed between an outer surface of the first dovetail dowel and an inner surface of the first dovetail rail, and securing the shim to the aircraft component by a fastener to retain the electrical pack in a final assembled position.

14. The method of claim 13, further comprising providing a second dovetail dowel on the surface of the electrical pack spaced apart from the first dovetail dowel, providing a second dovetail rail on the surface of the aircraft component spaced apart from the first dovetail rail, and sliding the second dovetail dowel within the second dovetail rail.

15. The method of claim 13, further comprising providing a second electrical pack having a first dovetail dowel and a second dovetail dowel, providing a second shim, and securing the second electrical pack spaced apart from the first electrical pack, wherein the second shim is disposed between the first electrical pack and the second electrical pack.

* * * * *